United States Patent
Lee et al.

(10) Patent No.: US 11,523,016 B1
(45) Date of Patent: Dec. 6, 2022

(54) DOCUMENT PROCESSING DEVICE AND SIZE DETERMINATION METHOD THEREOF

(71) Applicant: PRIMAX ELECTRONICS LTD., Taipei (TW)

(72) Inventors: Chih-Chia Lee, Taipei (TW); Chun-Chi Wang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/663,436

(22) Filed: May 16, 2022

(30) Foreign Application Priority Data

Mar. 7, 2022 (TW) .................................. 111108257

(51) Int. Cl.
*H04N 1/04* (2006.01)
*H04N 1/00* (2006.01)

(52) U.S. Cl.
CPC ..... *H04N 1/00708* (2013.01); *H04N 1/00599* (2013.01); *H04N 1/00734* (2013.01); *H04N 1/00755* (2013.01); *H04N 1/00891* (2013.01)

(58) Field of Classification Search
CPC ........... H04N 1/00708; H04N 1/00599; H04N 1/00734; H04N 1/00755; H04N 1/00891
See application file for complete search history.

(56) References Cited

U.S. PATENT DOCUMENTS

2012/0120456 A1\* 5/2012 Shiho ................. H04N 1/00424
358/448

\* cited by examiner

*Primary Examiner* — Moustapha Diaby
(74) *Attorney, Agent, or Firm* — WPAT, PC

(57) ABSTRACT

A size determination method for a document processing device is provided. The document processing device includes an automatic document feeding module. The automatic document feeding module includes a support tray, an entrance and a detecting module. The detecting module includes a front-row detector and plural rear-row detectors. The size determination method includes following steps. Firstly, a document with plural originals is placed on the support tray and inserted into the entrance. Then, a selected original of the document is transported. When the selected original is detected by the front-row detector, the plural rear-row detectors are powered on. The selected original is continuously transported, and the plural rear-row detectors are operated in a detection mode. Then, a size of the selected original is determined according to detection results of the plural rear-row detectors and a transfer time of the selected original.

18 Claims, 5 Drawing Sheets

TB1

| 31 | 32 | 33 | 34 | 35 | Detector no. / Preliminary result or status |
|---|---|---|---|---|---|
| ✓ | — | — | — | — | The rear-row detectors are powered on |
| ✓ | ✓ | ✗ | ✗ | ✗ | A6 or B6 |
| ✓ | ✓ | ✓ | ✗ | ✗ | A5 or B5 |
| ✓ | ✓ | ✓ | ✓ | ✗ | A4 or B4 |
| ✓ | ✓ | ✓ | ✓ | ✓ | A3 |
| ✗ | — | — | — | — | The original has been transferred across the front-row detector |

DOCUMENT PROCESSING DEVICE AND SIZE DETERMINATION METHOD THEREOF

FIELD OF THE INVENTION

The present invention relates to a document processing device and a size determination method for the document processing device, and more particularly to a device and a method for judging various sizes of originals in a non-contact detection manner during an automatic document feeding process.

BACKGROUND OF THE INVENTION

Printers and image scanners are common and widely used computer peripheral devices. In addition, they are indispensable devices for modern people when dealing with paperwork. For example, the multifunction peripherals used in companies, institutions or schools are multifunctional image processing devices. In addition to the general scanning function, the multifunction peripheral also has the printing, storing and transmitting functions.

The multifunction peripheral is usually equipped with an automatic document feeder (ADF). The automatic document feeder is installed in a liftable upper cover that is located over a placement platform. Only a single original or a sheet-like document is allowed be placed on the placement platform in order to be scanned. However, a stack of originals can be processed by the automatic document feeder. After a stack of originals are placed on the automatic document feeder, the originals can be successively fed into the upper cover of the multifunction peripheral in order to be scanned. Consequently, the use of the multifunction peripheral with the automatic document feeding function can increase the efficiency of the scanning or printing task.

Conventionally, when the automatic document feeder (ADF) is used to scan a stack of originals, the following methods are used to automatically detect the size of the stack of originals. Consequently, the paper cassette storing the papers with the corresponding size is selected to provide papers for printing.

In accordance with a first method, after the stack of originals is placed in an entrance of the automatic document feeder (ADF), a paper guide next to the entrance is pushed toward the stack of originals. Consequently, the size of the original is determined to be one of plural standard sizes according to the position of the paper guide. However, if the originals have more than one size (i.e., the stack of originals is a mixture of plural originals with different sizes), the use of this method is only able to push the paper guide to the original with the largest size and select the corresponding paper cassette to provide papers for printing. In other words, this method is unable to select the suitable paper cassette for all kinds of originals.

In accordance with a second method, plural sets of linkage rods and detectors are located at a bottom side of the entrance. After the stack of originals is placed into the entrance, the corresponding linkage rods are depressed and swung to trigger the corresponding detectors. According to the number of depressed linkage rod sets, the size of the original can be judged. However, due to the hardware limitations, the number of linkage rod sets is restricted. Generally, the automatic document feeder is only equipped with two sets of linkage rods that match the large-sized paper and the small-sized paper. Since these linkage rods are protruded from the bottom side of the entrance, some problems occur. For example, if a paper jam event occurs or multiple papers are simultaneously fed into the entrance because of static electricity stickiness, the feeding task is suspended and the original needs to be ejected from the entrance. The manually ejected original is easily contacted and squeezed by the linkage rods, and thus damaged.

In other words, when the originals with different sizes are subjected to the automatic document feeding process, the conventional technology is unable to select the suitable paper cassettes with the matching sizes to provide papers for printing. Even if the rough size discrimination is feasible, the contact structures of the automatic document feeder still result in the risk and problem of damaging the originals.

Therefore, it is important to provide a device and a method for effectively detecting and judging various sizes of originals and selecting suitable paper cassettes to provide papers for printing while maintaining the statuses of the originals and avoiding the damage of the originals.

SUMMARY OF THE INVENTION

The present invention provides a document processing device and a size determination method for the document processing device. The document processing device and the size determination method of the present invention can judge various sizes of originals in a non-contact detection manner during the automatic document feeding process. In addition, the document processing device and the size determination method of the present invention can select suitable paper cassettes to provide papers for printing while avoiding the damage of the originals.

In accordance with an aspect of the present invention, a document processing device is provided. The document processing device includes a host and an automatic document feeding module. The host transports papers with various sizes and performs a scanning and printing operation on the papers. The automatic document feeding module is located over the host. The automatic document feeding module includes a support tray, an entrance, a transfer channel and a detecting module. A document with plural originals is placed on the support tray. The entrance is located beside the support tray. The document is inserted into the entrance. The transfer channel is in communication with the entrance for allowing the originals to pass through. The detecting module is located beside the transfer channel. The detecting module includes a front-row detector and plural rear-row detectors. The front-row detector is arranged along a first line behind the entrance. The plural rear-row detectors are arranged along a second line behind the entrance. The second line is located behind the first line. There is a gap between the first line and the second line. When a selected original of the plural originals of the document is transported and detected by the front-row detector, the plural rear-row detectors are powered on and operated in a detection mode, and a size of the selected original is determined according to detection results of the plural rear-row detectors about the selected original and a transfer time of the selected original across the front-row detector.

In accordance with another aspect of the present invention, a size determination method for a document processing device is provided. The document processing device includes an automatic document feeding module. The automatic document feeding module includes a support tray, an entrance and a detecting module. The detecting module includes a front-row detector and plural rear-row detectors. The front-row detector is arranged along a first line behind the entrance. The plural rear-row detectors are arranged along a second line behind the entrance. The second line is located behind the first line and separated from the first line. The size determination method includes the following steps. Firstly, a document with plural originals is placed on the support tray, and the document is inserted into the entrance. Then, a selected original of the plural originals of the document is transported. When the selected original is detected by the front-row detector, the plural rear-row detectors are powered on. The selected original is continuously transported, and the plural rear-row detectors are operated in a detection mode. Then, a size of the selected original is determined according to detection results of the plural rear-row detectors about the selected original and a transfer time of the selected original across the front-row detector.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
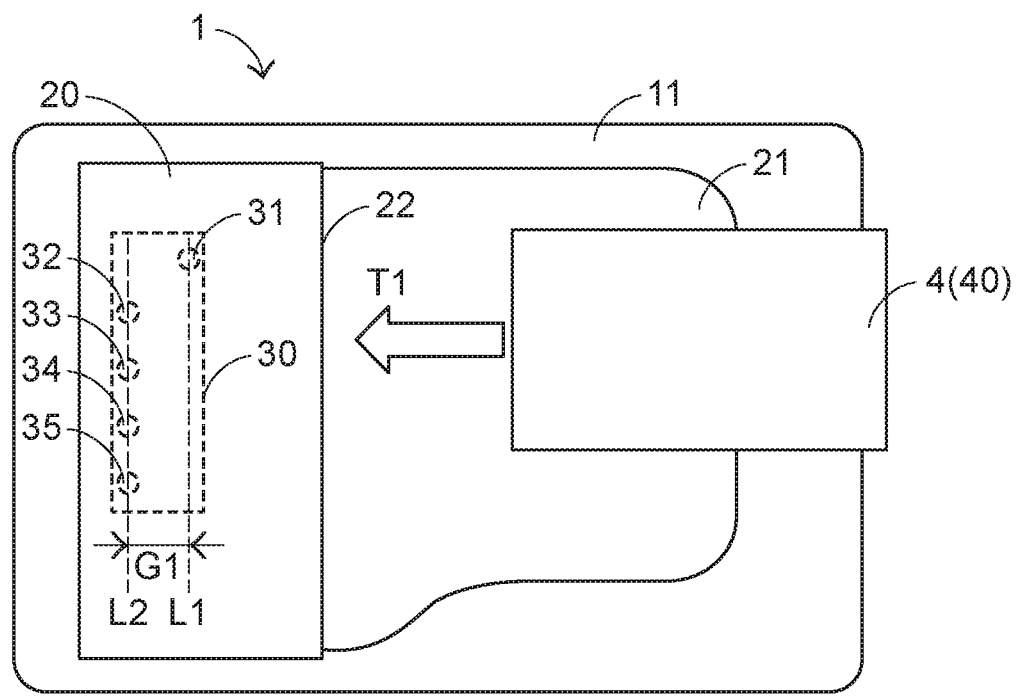
FIG. 1A is a schematic top view illustrating a document processing device according to an embodiment of the present invention.
Figure 1B:
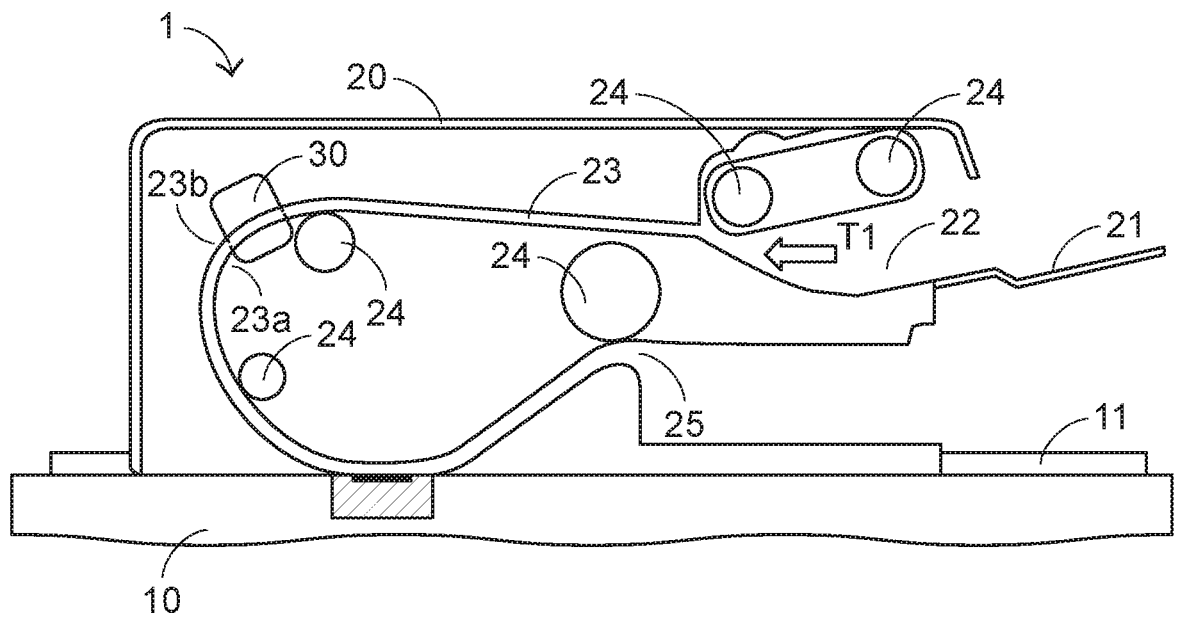
FIG. 1B is a schematic cross-sectional side view illustrating the document processing device according to the embodiment of the present invention.

The present invention provides a document processing device and a size determination method for the document processing device. Please refer to FIGS. 1A and 1B. FIG. 1A is a schematic top view illustrating a document processing device according to an embodiment of the present invention. FIG. 1B is a schematic cross-sectional side view illustrating the document processing device according to the embodiment of the present invention.

The document processing device 1 mainly comprises a host 10, an upper cover 11 and an automatic document feeding module 20. The host 10 is responsible for the scanning and printing functions. The host 10 comprises a placement platform, an optical module, plural paper cassettes, a printing module and associated hardware components. The host 10 is used to transport papers with various sizes and scan and print the papers. The automatic document feeding module 20 is located over the host 10. Especially, the automatic document feeding module 20 is disposed within the liftable upper cover 11, which is located over the placement platform. In FIG. 1A, the automatic document feeding module 20 is mainly shown. In FIG. 1B, the cross-sectional side view of the automatic document feeding module 20 is shown.

Please refer to FIGS. 1A and 1B again. The automatic document feeding module 20 mainly comprises a support tray 21, an entrance 22, a transfer channel 23, plural rollers 24 and a detecting module 30. The entrance 22 is located beside the support tray 21. The transfer channel 23 is in communication with the entrance 22. The plural rollers 24 are located beside a transfer path from the entrance 22 to the transfer channel 23. The detecting module 30 is located beside the transfer channel 23. In an embodiment, a document 4 with plural originals 40 is placed on the support tray 21 and inserted into the entrance 22. When the plural rollers 24 are controlled and rolled, the originals 40 are successively fed into and transferred through the transfer channel 23 in a one-by-one manner. After the originals 40 are scanned by the underlying optical module, the originals 40 are ejected from an exit 25.

Moreover, the rollers 24 are substantially evenly distributed beside the path of the transfer channel 23 in order to roll and transfer the originals. The detecting module 30 is located behind the entrance 22 for a specified distance. For example, the detecting module 30 is approximately in the vicinity of the bend region of the transfer channel 23. As shown in FIG. 1B, the detecting module 30 is located at the bend region of the transfer channel 23 because the bend region of the transfer channel 23 provides the sufficient space for circuitry installation. It is noted that the installation position of the detecting module 30 is not restricted.

In accordance with a feature of the present invention, the detecting module 30 is specially designed to detect the originals with various sizes in order to realize the sizes of the originals. That is, the originals 40 of the document 4 has more than one size. As shown in FIG. 1A, the detecting module 30 comprises plural detectors that are arranged in two rows. That is, the plural detectors are divided into a front-row detector 31 and plural rear-row detectors 32~35. The front-row detector 31 is arranged along a first line L1, which is located behind the entrance 22. The plural rear-row detectors 32~35 are arranged along a second line L2, which is located behind the entrance 22. The second line L2 is located behind the first line L1. In addition, there is a gap G1 between the second line L2 and the first line L1. In other words, the front-row detector 31 is closer to the entrance 22 than the rear-row detectors 32~35.

Please refer to FIG. 1A again. After the originals 40 of the document 4 are managed, the originals 40 are inserted into the entrance 22 with the short sides of the originals 40 facing the entrance 22. In this embodiment, the number of the plural rear-row detectors 32~35 is four. The number of the rear-row detectors 32~35 is related to the number of possible sizes of the originals 40. Moreover, both of the second line L2 and the first line L1 are in parallel with the entrance 22. That is, the distances of the rear-row detectors 32~35 from the entrance 22 are equal. The gap G1 is properly determined. That is, the gap G1 is not too large or too small. Preferably, the gap G1 is determined according to the size of the overall upper cover 11 and the performance of the detecting module 30.

In accordance with another feature, the detecting module 30 detects the fed originals in an optical non-contact detection manner. That is, during the process of transferring and detecting the originals, the detecting module 30 is not contacted with the originals. Consequently, the originals are not damaged. In an embodiment, all of the detectors of the detecting module 30 (i.e., the front-row detector 31 and the plural rear-row detectors 32~35) have the functions of emitting and receiving light beams. For example, each of these detectors has the function of emitting a detecting beam, and the detecting beam is an infrared beam (IR). It is noted that the concepts of the present invention are not restricted.

Figure 2A:
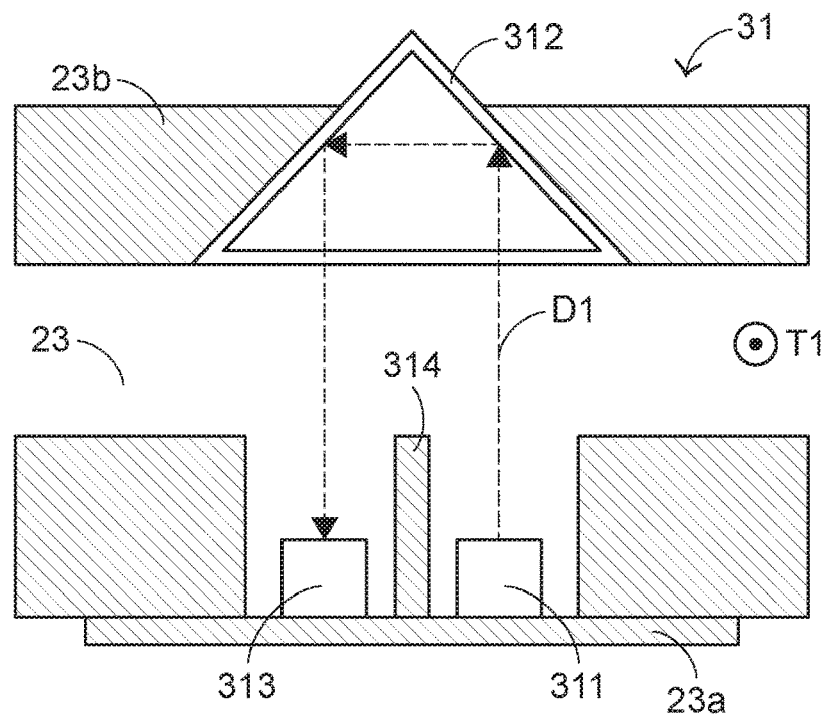
FIG. 2A is a schematic cross-sectional side view illustrating the front-row detector in the detecting module of the document processing device according to the embodiment of the present invention, in which no original is being transferred through the transfer channel.
Figure 2B:
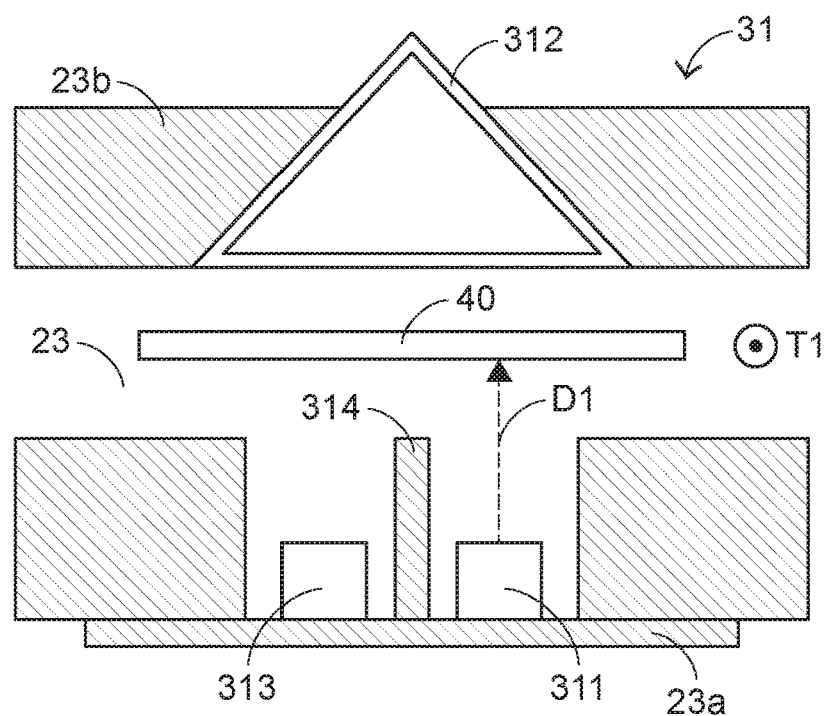
FIG. 2B is a schematic cross-sectional side view illustrating the front-row detector in the detecting module of the document processing device according to the embodiment of the present invention, in which an original is being transferred through the transfer channel.

In FIGS. 2A and 2B, the cross-sectional side views of the front-row detector 31 are shown. FIG. 2A is a schematic cross-sectional side view illustrating the front-row detector in the detecting module of the document processing device according to the embodiment of the present invention, in which no original is being transferred through the transfer channel. FIG. 2B is a schematic cross-sectional side view illustrating the front-row detector in the detecting module of the document processing device according to the embodiment of the present invention, in which an original is being transferred through the transfer channel.

In FIGS. 2A and 2B, the front-row detector 31 is taken as an example for illustration. In detecting module 30 of this embodiment, the components and constitutes of each of the rear-row detectors 32~35 are identical to those of the front-row detector 31. As shown in FIGS. 2A and 2B, the front-row detector 31 comprises an emitting element 311, a reflecting element 312 and a receiving element 313. The emitting element 311 is located at a first side 23a of the transfer channel 23. The reflecting element 312 is located at a second side 23b of the transfer channel 23. The first side 23a and the second side 23b of the transfer channel 23 are opposed to each other. The receiving element 313 is located at the first side 23a of the transfer channel 23. That is, the receiving element 313 and the emitting element 311 are located at the same side with respect to the transfer channel 23.

As shown in FIG. 1B, the first side 23a of the transfer channel 23 is an inner side of the bend region of the transfer channel 23, and the second side 23b of the transfer channel 23 is an outer side of the bend region of the transfer channel 23. FIGS. 2A and 2B are cross-sectional views taken along the first line L1. That is, the emitting element 311, the reflecting element 312 and the receiving element 313 are arranged along the same vertical plane. A transferring direction (or an insertion direction) T1 of the original 40 is an outward direction, which is directed outside the paper plane and represented by the arrow and dot sign.

The emitting element 311 emits a detecting beam D1. In an embodiment, the reflecting element 312 is a triangular prism with an included angle. The included angle is specially determined. Consequently, the detecting beam D1 can be reflected out from the reflecting element 312 in the opposite direction. Then, the reflected detecting beam D1 from the reflecting element 312 is received by the receiving element 313.

Please refer to FIG. 2A again. When the original 40 is not being transferred through the transfer channel 23, the transfer channel 23 is in an empty state. Under this circumstance, the detecting beam D1 is not blocked. Consequently, the reflected detecting beam D1 can be received by the receiving element 313 completely. Please refer to FIG. 2B again. When the original 40 is being transferred through the transfer channel 23, the detecting beam D1 is blocked by the original 40. Under this circumstance, the detecting beam D1 cannot be reflected by the reflecting element 312, and the detecting beam D1 cannot be received by the receiving element 313. In other words, when the original 40 is being transferred through the transfer channel 23 and the detecting beam D1 is blocked, the condition of the detecting beam D1 received by the receiving element 313 is changed. According to the condition change, the detecting module 30 or the associated processor judges that the original 40 is being transferred through the transfer channel 23.

In an embodiment, the detecting beam D1 to be emitted and received by the detecting module 30 is an infrared (IR) ray. The receiving element 313 and the emitting element 311 are located at the same side with respect to the transfer channel 23. In addition, the receiving element 313 and the emitting element 311 are located beside each other. Please refer to FIGS. 2A and 2B again. For preventing from the interference between the receiving element 313 and the emitting element 311 when emitting and receiving the detecting beam, the front-row detector 31 further comprises a separation structure 314. The separation structure 314 is arranged between the emitting element 311 and the receiving element 313. Consequently, the operations of the emitting element 311 and the receiving element 313 are not influenced by each other. Due to the arrangement of the separation structure 314, the detecting beam D1 from the emitting element 311 is not directly detected by the receiving element 313. That is, only the portion of the detecting beam D1 reflected by the reflecting element 312 can be received by the receiving element 313.

As mentioned above, the components and constitutes of each of the rear-row detectors 32~35 are identical to those of the front-row detector 31. That is, each of the rear-row detectors 32~35 comprises an emitting element, a reflecting element, a receiving element and a separation structure, and the relative positions of these components with respect to the transfer channel 23 are identical to those of the front-row detector 31. In each of the rear-row detectors 32~35, the emitting element, the reflecting element and the receiving element are also arranged along the same vertical plane. However, in comparison with the front-row detector 31, the rear-row detectors 32~35 are arranged along the second line L2. These rear-row detectors 32~35 are arranged side by side. For preventing from the interference, every two adjacent ones of the rear-row detectors 32~35 are separated from each other by a separation structure, which is similar to the above-mentioned separation structure 314. Similarly, the rear-row detectors 32~35 can emit and receive the detecting beam. According to the change of the condition of emitting and receiving the detecting beam, the detecting module 30 or the associated processor judges that the original 40 is being transferred through the transfer channel 23. However, the rear-row detectors 32~35 are responsible for judging the size of the original, and the front-row detector 31 is response for judging whether the size judgement process needs to be started.

Figures 3A, 3B:
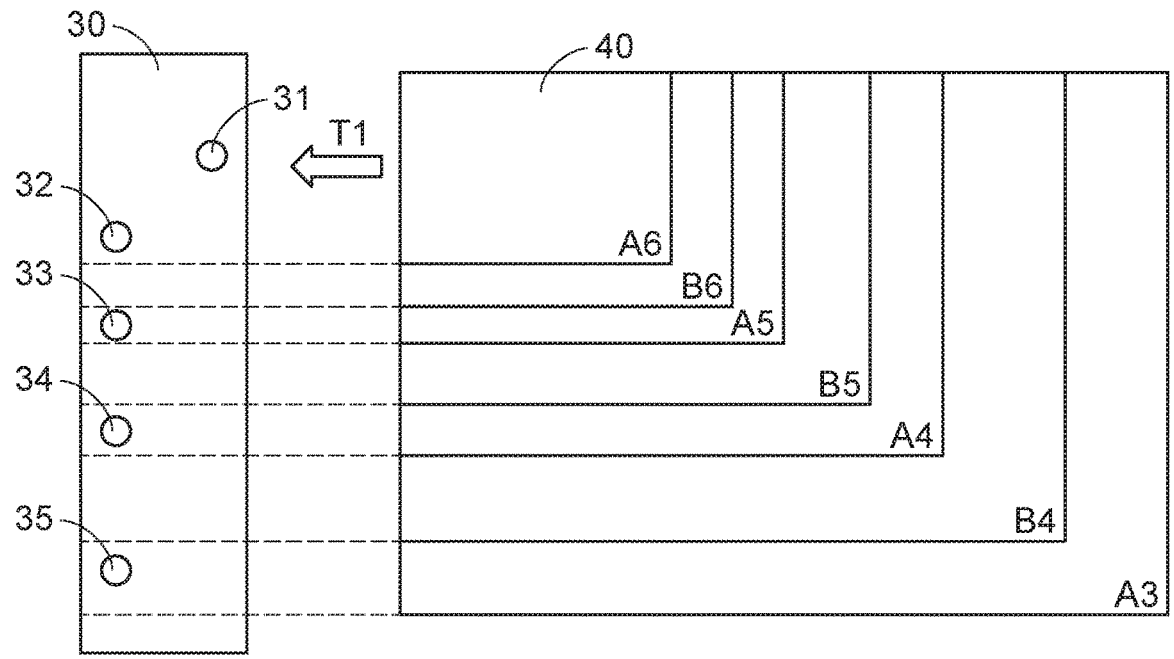
FIG. 3A schematically illustrates the position relationships between the detecting module and the originals with various sizes.
FIG. 3B schematically illustrates a look-up table TB1 about the relationship between the sizes of the originals and the detection results of the detecting module.

Please refer to FIGS. 3A and 3B. FIG. 3A schematically illustrates the position relationships between the detecting module and the originals with various sizes. FIG. 3B schematically illustrates a look-up table TB1 about the relationship between the sizes of the originals and the detection results of the detecting module. In FIGS. 3A and 3B, the symbols A3~A6 and B4~B6 represent paper sizes.

Please refer to FIG. 3A. In an embodiment, the originals 40 are inserted into the entrance 22, wherein the short sides of the originals 40 face the entrance 22. In addition, some commonly used paper sizes are taken as the example. For example, the paper sizes include A3~A6 of A series and B4~B6 of B series. These paper sizes are rectangular. After the originals 40 with various sizes are managed, two sides of the originals 40 are aligned with each other. For example, the upper left corners of all originals 40 are aligned with each other. Then, the originals are fed into and transported, wherein the short sides of the originals 40 face the entrance 22. The widths of the short sides of the originals 40 are related to the corresponding positions of the rear-row detectors 326~35.

In an embodiment, the front-row detector 31 is the closest to the edge. Consequently, regardless of the size of the original, the original fed into and transferred through the transfer channel 23 can be first detected by the front-row detector 31. Then, the original is continuously transported. In case that the size of the original is A6 or B6, the border of the short side width of the original is aligned with the region between the two rear-row detectors 32 and 33. Consequently, the rear-row detector 32 is sheltered by the original. In case that the size of the original is A5 or B5, the border of the short side width of the original is aligned with the region between the two rear-row detectors 33 and 34. Consequently, the rear-row detectors 32 and 33 are sheltered by the original. In case that the size of the original is A4 or B4, the border of the short side width of the original is aligned with the region between the two rear-row detectors 34 and 35. Consequently, the rear-row detectors 32, 33 and 34 are sheltered by the original. In case that the size of the original is A3, the border of the short side width of the original is outside the rear-row detector 35. Consequently, the rear-row detectors 32, 33, 34 and 35 are sheltered by the original.

In an embodiment, the document processing device 1 further comprises a processor (not shown) and a memory (not shown). The processor and the memory are installed in the host 10. The processor is in communication with the detecting module 30 to receive the detection results of the detecting module 30. Moreover, according to the detection results, the processor performs associated processing and controlling operations. The look-up table TB1 as shown in FIG. 3B is stored in the memory. The processor can read the look-up table TB1 from the memory in order to judge the size of the corresponding original. In FIG. 3B, the tick mark represents that the corresponding original has been detected, and the cross mark represents that the corresponding original has not been detected. According to the result of judging which detectors detect the original, the possible size of the original can be realized. The size determination method of the present invention will be described in more details as follows.

Figure 4:
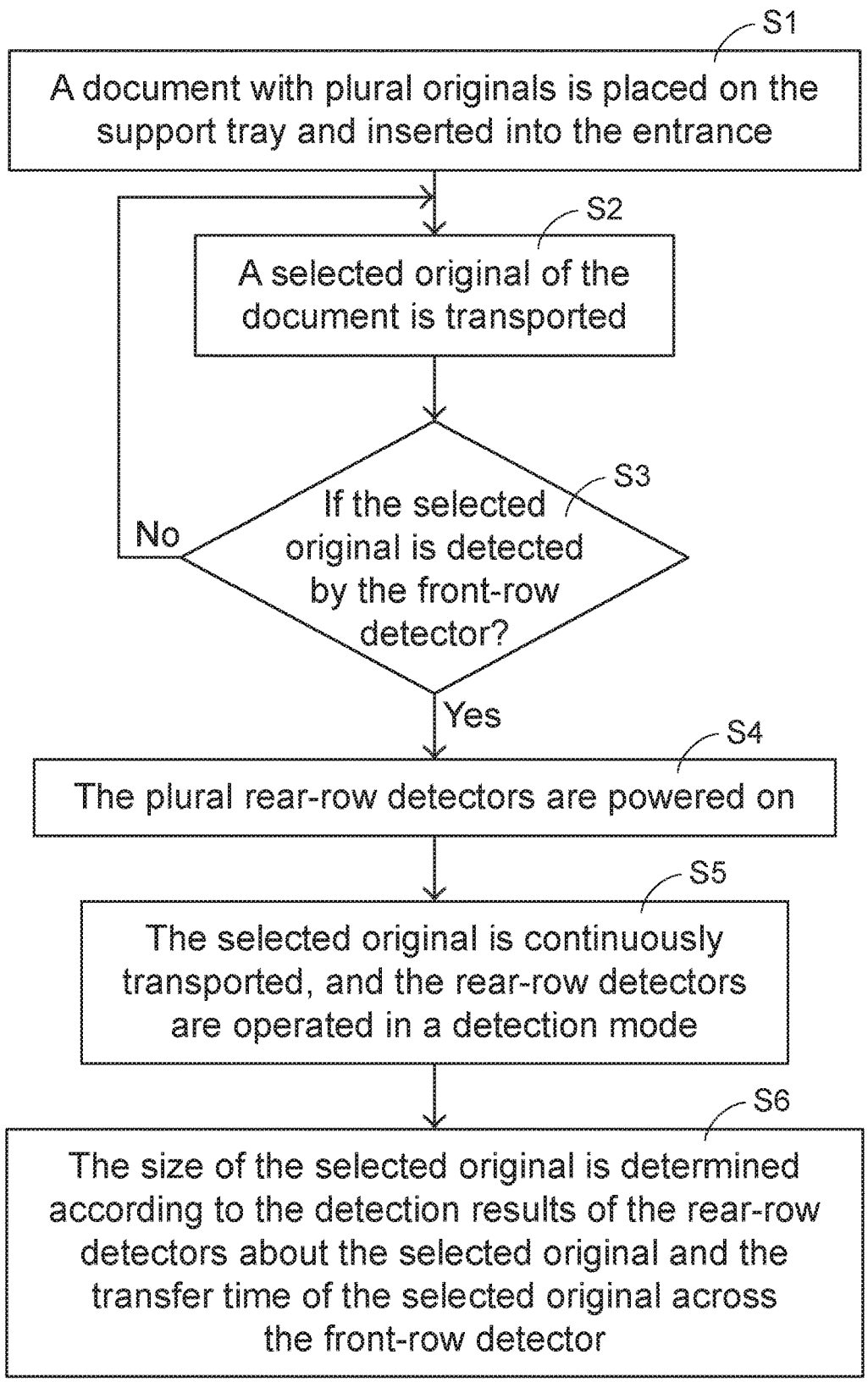
FIG. 4 is a flowchart illustrating a size determination method according to an embodiment of the present invention.

FIG. 4 is a flowchart illustrating a size determination method according to an embodiment of the present invention.

Firstly, in a step S1, a document 4 with plural originals 40 is placed on the support tray 21 and inserted into the entrance 22. Then, in a step S2, a selected original 40 of the document 4 is transported. Then, a step S3 is performed to judge whether the original 40 is detected by the front-row detector 31. If the selected original 40 is detected by the front-row detector 31, the rear-row detectors 32~35 are powered on (Step S4). Then, the selected original 40 is continuously transported, and the rear-row detectors 32~35 are operated in a detection mode (Step S5). Afterwards, in a step S6, the size of the selected original 40 is determined according to the detection results of the rear-row detectors 32~35 about the selected original 40 and the transfer time of the selected original 40 across the front-row detector 31.

The detailed procedures of the steps S1 and S2 will be described as follows. In an embodiment, the originals 40 of the document 4 may have various sizes. During the operations, these originals 40 have been first managed. For example, the upper left corners of all originals 40 are aligned with each other. That is, two sides of the originals are aligned with each other. After the alignment is completed, the originals 40 are placed on the support tray 21 and inserted into the entrance 22. Generally, a paper stopper (not shown) is located at a side of the entrance 22 to indicate the placement position of using the automatic document feeding module 20. Consequently, these originals 40 can be accurately and conveniently aligned and inserted. Then, the user may press or operate a user interface or a button of the host 10, and thus originals 40 are successively fed into the transfer channel 23 by the plural rollers 24.

After the document 4 is inserted into the entrance 22 and before the originals 40 are transported, the steps S1 and S2 further comprise the following steps. For example, the host 10 judging whether a scanning command, a printing command or any other working command is issued from the user interface or the button of the host 10. If the judging condition is satisfied, the papers are successively picked up (i.e., the originals 40 are fed into the transfer channel 23). Whereas, if the judging condition is not satisfied, the document processing device 1 is maintained in a standby state.

The detailed procedures of the step S3 will be described as follows. In an embodiment, the front-row detector 31 is arranged along the first line L1, which is located behind the entrance 22. There is a specified distance between the front-row detector 31 and the entrance 22. For effectively implementing the size determination, the front-row detector 31 is powered on before the automatic document feeding function is enabled. That is, when the originals 40 are placed on the support tray 21 and inserted into the entrance 22, the originals 40 are detected by other existing detectors, and the front-row detector 31 is powered on. Consequently, when one of the originals 40 is fed into the transfer channel 23 and transported to the position corresponding to the front-row detector 31, the front-row detector 31 can respond immediately to detect the original 40.

It is noted that numerous modifications and alterations may be made while retaining the teachings of the invention. For example, in another embodiment, the front-row detector 31 is powered on and maintained in the standby state when the document processing device 1 is powered on.

If the corresponding original 40 is detected by the front-row detector 31, the subsequent step will be performed. That is, the step S4 of powered on the rear-row detectors 32~35 is performed. However, in some situations, the corresponding original 40 is not detected by the front-row detector 31. For example, if the rollers 24 at the entrance 22 fails to pick up the paper or the original 40 is clamped, skewed and not normally transported to the position corresponding to the front-row detector 31, the original 40 cannot be successfully detected by the front-row detector 31. After the fault condition is deleted, the steps S1 and S2 are repeatedly done. In some embodiments, the host 10 further issues a message for prompting the user to manage and place the originals 40 again.

In accordance with another feature of the present invention, the rear-row detectors 32~35 are powered on after the original 40 is successfully detected by the front-row detector 31. That is, before the automatic document feeding function is enabled, the rear-row detectors 32~35 are powered off. Consequently, the power-saving efficacy is enhanced.

However, if the rear-row detectors 32~35 start to perform detection immediately after the rear-row detectors 32~35 are powered on, an erroneous detection problem possibly occur because the rear-row detectors 32~35 are just electrically conducted and not in the ready state. For assuring the effective operations of the rear-row detectors 32~35, the steps S4 and S5 further comprise the following steps after the rear-row detectors 32~35 are powered on and before the rear-row detectors 32~35 start to perform detection. For example, after the rear-row detectors 32~35 have been powered on for a specified time period, the rear-row detectors 32~35 start to detect. That is, the rear-row detectors 32~35 enters a detection mode. Due to the buffering efficacy of the specified time period, the rear-row detectors 32~35 can be operated stably. Consequently, the accurate detection results of the rear-row detectors 32~35 can be obtained. In case that the performance of the rear-row detectors 32~35 is high, the length of the specified time period may be shortened. Moreover, the length of the specified time period is determined according to the magnitude of the gap G1 between the first line L1 and the second line L2. In an embodiment, the length of the specified time period is set as 100 ms.

In the step S5, some of the rear-row detectors 32~35 are sheltered according to the size of the transported original 40. In other words, the transported original 40 is successfully detected by some of the rear-row detectors 32~35. In an embodiment, the transported original 40 is successfully detected by one or more rear-row detectors (e.g., at most four rear-row detectors).

For enhancing the power-saving efficacy, the size determination method of the present invention further comprises the following steps after the detection of the rear-row detectors 32~35 in the step S5 is completed. For example, the detection results of the corresponding rear-row detectors are transmitted to the processor for judgment. After the detection result of the at least one rear-row detector is received by the processor, the rear-row detectors 32~35 are powered off.

Please refer to FIGS. 3A and 3B again. As mentioned above, the size of the original 40 detected by the corresponding rear-row detector is a preliminary result. After the original 40 is detected by the front-row detector 31, the original 40 is continuously transported. If the original 40 is successfully detected by the rear-row detector 32 only, the size of the original 40 is A6 or B6. If the original 40 is successfully detected by the two rear-row detectors 32 and 33 only, the size of the original 40 is A5 or B5. If the original 40 is successfully detected by the three rear-row detectors 32, 33 and 34 only, the size of the original 40 is A4 or B4. If the original 40 is successfully detected by the four rear-row detectors 32, 33, 34 and 35, the size of the original 40 is A3.

When the corresponding original 40 is detected by the front-row detector 31 and transported, it means that the original 40 is being transferred through the front-row detector 31. Until the original 40 is not detected by the front-row detector 31 again (i.e., the detecting beam D1 from the emitting element 311 of the front-row detector 31 is received by the receiving element 313 of the front-row detector 31 again), it means that the original 40 has been transferred through the front-row detector 31. After the transfer time of the original 40 (i.e., the time period between the time point of detecting the original 40 by the front-row detector 31 and the time point of not detecting the original 40 by the front-row detector 31) is multiplied by the transfer speed of the original 40 (i.e., the rolling speed of the rollers 24), the length of the original 40 can be obtained.

In this embodiment, the originals 40 of the document 4 are managed and aligned, and the short sides of the originals 40 are inserted into the entrance 22. The preliminary results corresponding to the originals 40 detected by the rear-row detectors 32~35 are the possible sizes about the widths. Moreover, the length of the original 40 is calculated according to the product of the transfer time of the original 40 and the transfer speed of the original 40. However, the lengths corresponding to the two sizes in each preliminary result are different. For example, the length of the size B4 is larger than the length of the size A4. The lengths and widths of the sizes of A series and B series are known, and the associated data are stored in the memory. After the obtained length of the original is compared with the known sizes, the actual size of the original 40 can be determined according to the preliminary result.

The size judgement process in the step S6 further comprises the following steps. Firstly, the processor reads the look-up table TB1 according to the detection results of the plural rear-row detectors 32~35, and thus a preliminary result is determined. As the corresponding original 40 is continuously transported and the original 40 is not detected by the front-row detector 31 again, the processor calculates the transfer time and the transfer distance of the original 40 (i.e., the time period of transferring the original 40 through the front-row detector 31). Consequently, the processor determines the size of the original 40 according to the preliminary result.

After the actual size of the original 40 is accurately determined, the associated scanning or printing task will be performed. That is, after the step S6, the size determination method further comprises the following steps. For example, according to the size of the corresponding original 40, the host 10 selects the suitable paper cassette with the matching size to provide papers for printing. Especially, all of the originals 40 of the document 4 can undergo the above steps of the size determination method, and the paper cassettes with the matching sizes are selected to provide papers for printing. In other words, even if the original has a smaller size, the improper situation of selecting the larger-size paper for printing will not occur.

In the above embodiment, each original 40 is inserted into the entrance 22 with the short side of the original 40 facing the entrance 22. It is noted that numerous modifications and alterations may be made while retaining the teachings of the invention. For example, in another embodiment, each original 40 is inserted into the entrance 22 with the long side of the original 40 facing the entrance 22. Alternatively, in some other embodiments, the short sides of some originals face the entrance, and the long sides of the other originals face the entrance. The variant examples are also effective to judge the sizes of the originals 40.

However, due to the hardware limitations, the automatic document feeder of the general multifunction peripheral or printer is not very large. Consequently, the larger-sized original is only permitted to be inserted into the entrance with its short side (i.e., the transverse side) facing the entrance. On contrast, some smaller-size originals (e.g., A6 or B6 originals) can be inserted into the entrance with its long side (i.e., the longitudinal side) facing the entrance. For meeting the hybrid insertion requirements, the number of the rear-row detectors, the installation positions of the rear-row detectors and the look-up table corresponding to the combination of the rear-row detectors need to be correspondingly adjusted. Moreover, the size of the original 40 can be accurately judged according to the transfer time and the transfer distance of the original 40.

Figure 5:
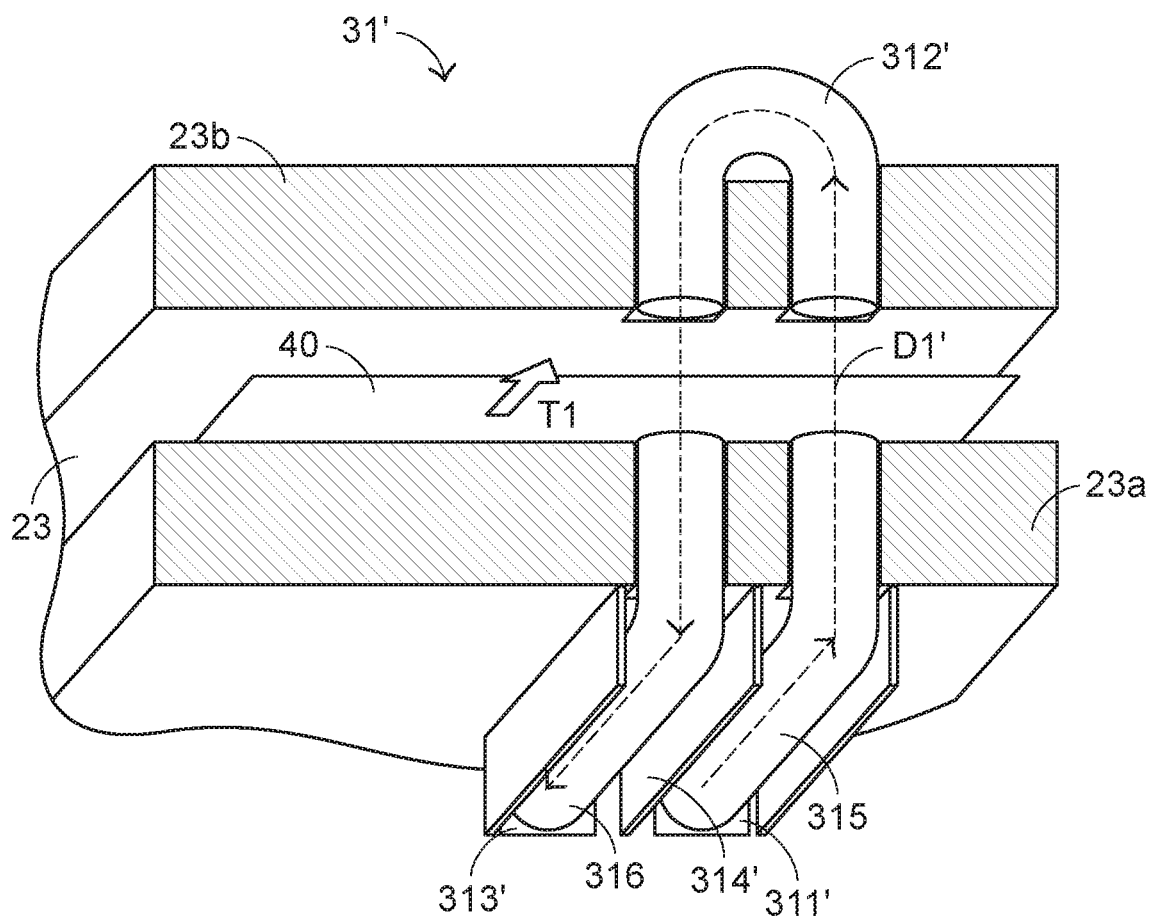
FIG. 5 is a cutaway view illustrating a variant example of the front-row detector in the detecting module of the document processing device according to the embodiment of the present invention.

The example of the front-row detector may be varied. FIG. 5 is a cutaway view illustrating a variant example of the front-row detector in the detecting module of the document processing device according to the embodiment of the present invention. In the detecting module of this embodiment, the components and constitutes of each of the rear-row detectors are identical to those of the front-row detector. In comparison with FIGS. 2A and 2B, the front-row detector 31' further comprises a first extension structure 315 and a second extension structure 316. A first end of the first extension structure 315 and a first end of the second extension structure 316 are aligned with a reflecting element 312'. A second end of the first extension structure 315 is aligned with an emitting element 311'. A second end of the second extension structure 316 is aligned with a receiving element 313'. In addition, a separation structure 314' is arranged between the emitting element 311' and the receiving element 313'.

During the transportation process of the original, the original is easy to generate electrostatic charges because of friction. The accumulation of large amounts of electrostatic charges may cause damage of the delicate electronic components such as the emitting element and the receiving element. Generally, the original is a paper. In addition, the paper is mostly white. Even if the detecting beam is blocked by the original, the detecting beam is possibly reflected to the receiving element because of the material of the paper. Consequently, the erroneous judgment occurs. For avoiding the above problems, it is preferred that the emitting element 311' and the receiving element 313' in the optical path are not very close to the original 40. In accordance with a feature, each of the first extension structure 315 and the second extension structure 316 has a 90-degree bent region for reflecting and transmitting the detecting beam D1' by 90 degrees. Due to this structural design, the emitting path and the receiving path of the detecting beam are extended, and the possibility of causing damage by the electrostatic discharge is effectively reduced. Moreover, since the overall thickness of the front-row detector 31' or the detecting module is not increased, the slim appearance is maintained.

In the embodiment of FIGS. 2A and 2B, the reflecting element 312 is a triangular prism. In comparison with FIGS. 2A and 2B, the reflecting element 312' of this embodiment has an elbow structure. Consequently, the detecting beam D1' can be diffused and propagated within the reflecting element 312'. The triangular prism of the reflecting element 312 in FIGS. 2A and 2B are effective to reflect the detecting beam D1. However, if the installation angle of the triangular prism is slightly shifted, the reflected detecting beam D1 cannot be effectively received by the receiving element 313, and thus the reception error is generated. The elbow structure of the reflecting element 312' as shown in FIG. 5 can avoid the above problem as long as the two ends of the reflecting element 312' are respectively aligned with the first extension structure 315 and the second extension structure 316. In an embodiment, each of the reflecting element 312', the first extension structure 315 and the second extension structure 316 is an optical fiber.

From the above descriptions, the present invention provides a document processing device and a size determination method for the document processing device. As mentioned above, the conventional technology determines the sizes of the originals in the contact detection manner. In addition, the conventional technology is only permitted to judge the originals with two sizes. The technology of the present invention can judge various sizes of originals in a non-contact detection manner during the automatic document feeding process. In addition, the technology of the present invention can select suitable paper cassettes to provide papers for printing while avoiding the damage of the originals.

In other words, the document processing device and the size determination method of the present invention are capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A document processing device, comprising:
    a host transporting papers with various sizes and performing a scanning and printing operation on the papers, and
    an automatic document feeding module located over the host, and comprising a support tray, an entrance, a transfer channel and a detecting module, wherein a document with plural originals is placed on the support tray, the entrance is located beside the support tray, the document is inserted into the entrance, the transfer channel is in communication with the entrance for allowing the originals to pass through, the detecting module is located beside the transfer channel, and the detecting module comprises a front-row detector and plural rear-row detectors, wherein the front-row detector is arranged along a first line behind the entrance, the plural rear-row detectors are arranged along a second line behind the entrance, the second line is located behind the first line, and there is a gap between the first line and the second line,
    wherein when a selected original of the plural originals of the document is transported and detected by the front-row detector, the plural rear-row detectors are powered on and operated in a detection mode, and a size of the selected original is determined according to detection results of the plural rear-row detectors about the selected original and a transfer time of the selected original across the front-row detector.

2. The document processing device according to claim 1, wherein the plural originals of the document have more than one size, and the papers with the sizes matching the originals are selected by the host so as to be transported and printed.

3. The document processing device according to claim 1, wherein the front-row detector comprises:
    a first emitting element located at a first side of the transfer channel, and generating a first detecting beam;
    a first reflecting element located at a second side of the transfer channel, and reflecting the first detecting beam, wherein the first side and the second side of the transfer channel are opposed to each other; and a first receiving element located at the first side of the transfer channel, and receiving the first detecting beam, wherein when the selected original is transported and the first detecting beam is blocked by the selected original, a condition of the first detecting beam to be received by the first receiving element is changed.

4. The document processing device according to claim 3, wherein the front-row detector further comprises a first separation structure, and the first separation structure is arranged between the first emitting element and the first receiving element.

5. The document processing device according to claim 3, wherein the front-row detector further comprises a first extension structure and a second extension structure, wherein a first end of the first extension structure and a first end of the second extension structure are aligned with the first reflecting element, a second end of the first extension structure is aligned with the first emitting element, and a second end of the second extension structure is aligned with the first receiving element.

6. The document processing device according to claim 1, wherein each of the plural rear-row detectors comprises:

a second emitting element located at a first side of the transfer channel, and generating a second detecting beam;

a second reflecting element located at a second side of the transfer channel, and reflecting the second detecting beam, wherein the first side and the second side of the transfer channel are opposed to each other; and a second receiving element located at the first side of the transfer channel, and receiving the second detecting beam, wherein when the selected original is transported and the second detecting beam is blocked by the selected original, a condition of the second detecting beam to be received by the second receiving element is changed.

7. The document processing device according to claim 6, wherein each of the plural rear-row detectors further comprises a second separation structure, and the second separation structure is arranged between the second emitting element and the second receiving element.

8. The document processing device according to claim 6, wherein each of the plural rear-row detectors further comprises a first extension structure and a second extension structure, wherein a first end of the first extension structure and a first end of the second extension structure are aligned with the second reflecting element, a second end of the first extension structure is aligned with the second emitting element, and a second end of the second extension structure is aligned with the second receiving element.

9. The document processing device according to claim 1, wherein the document processing device further comprises a processor and a memory, and a look-up table is stored in the memory, wherein the processor reads the look-up table according to the detection results of the plural rear-row detectors about the selected original and determines a preliminary result according to the look-up table.

10. The document processing device according to claim 9, wherein as the selected original is continuously transported and the original is not detected by the front-row detector again, the processor calculates the transfer time of the selected original across the front-row detector and a corresponding transfer distance of the selected original and determines the size of the selected original according to the preliminary result.

11. A size determination method for a document processing device, the document processing device comprising an automatic document feeding module, the automatic document feeding module comprising a support tray, an entrance and a detecting module, the detecting module comprising a front-row detector and plural rear-row detectors, the front-row detector being arranged along a first line behind the entrance, the plural rear-row detectors being arranged along a second line behind the entrance, the second line being located behind the first line and separated from the first line, the size determination method comprising:

placing a document with plural originals on the support tray, and inserting the document into the entrance;

transporting a selected original of the plural originals of the document;

when the selected original is detected by the front-row detector, powering on the plural rear-row detectors;

continuously transporting the selected original, and allowing the plural rear-row detectors to be operated in a detection mode; and determining a size of the selected original according to detection results of the plural rear-row detectors about the selected original and a transfer time of the selected original across the front-row detector.

12. The size determination method according to claim 11, wherein the document processing device further comprises a host, and the host transports papers with various sizes and performs a scanning and printing operation on the papers, wherein the plural originals of the document have more than one size, and the papers with the sizes matching the originals are selected by the host so as to be transported and printed.

13. The size determination method according to claim 11, wherein the automatic document feeding module further comprises a transfer channel, and the transfer channel is in communication with the entrance, wherein the front-row detector comprises:

a first emitting element located at a first side of the transfer channel, and generating a first detecting beam;

a first reflecting element located at a second side of the transfer channel, and reflecting the first detecting beam, wherein the first side and the second side of the transfer channel are opposed to each other; and a first receiving element located at the first side of the transfer channel, and receiving the first detecting beam, wherein when the selected original is transported and the first detecting beam is blocked by the selected original, a condition of the first detecting beam to be received by the first receiving element is changed.

14. The size determination method according to claim 11, wherein the automatic document feeding module further comprises a transfer channel, and the transfer channel is in communication with the entrance, wherein each of the plural rear-row detectors comprises:

a second emitting element located at a first side of the transfer channel, and generating a second detecting beam;

a second reflecting element located at a second side of the transfer channel, and reflecting the second detecting beam, wherein the first side and the second side of the transfer channel are opposed to each other; and a second receiving element located at the first side of the transfer channel, and receiving the second detecting beam, wherein when the selected original is transported and the second detecting beam is blocked by the selected original, a condition of the second detecting beam to be received by the second receiving element is changed.

15. The size determination method according to claim 11, wherein the size determination method further comprises a step of allowing the plural rear-row detectors to be operated in the detection mode after the plural rear-row detectors have been powered on for a specified time period.

16. The size determination method according to claim 11, wherein the size determination method further comprises a step of powering off the plural rear-row detectors after a processor of the document processing device receives the detection results of the plural rear-row detectors.

17. The size determination method according to claim 11, wherein the document processing device further comprises a processor and a memory, and a look-up table is stored in the memory, wherein the processor reads the look-up table according to the detection results of the plural rear-row detectors about the selected original and determines a preliminary result according to the look-up table.

18. The size determination method according to claim 17, wherein as the selected original is continuously transported and the original is not detected by the front-row detector again, the processor calculates the transfer time of the selected original across the front-row detector and a corresponding transfer distance of the selected original and determines the size of the selected original according to the preliminary result.

\* \* \* \* \*